United States Patent
Cox et al.

(10) Patent No.: US 6,524,360 B2
(45) Date of Patent: Feb. 25, 2003

(54) MELT BLOWN COMPOSITE HEPA FILTER MEDIA AND VACUUM BAG

(75) Inventors: Stephen T. Cox, Radford, VA (US); David T. Healey, Christianburg, VA (US)

(73) Assignee: Hollingsworth & Vose Company, East Walpole, MA (US)

(*) Notice: Subject to any disclaimer, the term of this patent is extended or adjusted under 35 U.S.C. 154(b) by 0 days.

(21) Appl. No.: 09/783,199

(22) Filed: Feb. 14, 2001

(65) Prior Publication Data

US 2001/0042361 A1 Nov. 22, 2001

Related U.S. Application Data

(60) Provisional application No. 60/182,620, filed on Feb. 15, 2000.

(51) Int. Cl.[7] ................................................. B03C 3/28
(52) U.S. Cl. ........................... 55/382; 55/485; 55/486; 55/487; 55/527; 55/528; 55/DIG. 5; 55/DIG. 39; 264/169; 264/210.3; 264/210.4; 264/DIG. 48
(58) Field of Search ........................... 95/57, 78, 286, 95/287; 96/15, 65, 66, 69; 55/382, 485, 486, 487, 528, DIG. 2, DIG. 3, DIG. 5, DIG. 39; 264/DIG. 48; 15/347, 352; 428/340, 903; 442/389

(56) References Cited

U.S. PATENT DOCUMENTS

| | | |
|---|---|---|
| 3,068,510 A | 12/1962 | Coleman |
| 3,316,232 A | 4/1967 | McGann, Jr. |
| 3,419,640 A | 12/1968 | Burklin |
| 3,740,325 A | 6/1973 | Manion et al. |
| 3,867,187 A | 2/1975 | Borenstein |
| 4,264,750 A | 4/1981 | Anand et al. |
| 4,404,256 A | 9/1983 | Anand et al. |
| 4,407,852 A | 10/1983 | Sapieha et al. |
| 4,508,775 A | 4/1985 | Adiletta |
| 4,589,894 A * | 5/1986 | Gin et al. ...................... 55/382 |
| 4,593,050 A | 6/1986 | Cohen et al. |
| 4,626,263 A | 12/1986 | Inoue et al. |
| 4,789,504 A | 12/1988 | Ohmori et al. |
| 4,828,585 A | 5/1989 | Chiao |
| 4,845,132 A | 7/1989 | Masuoka et al. |
| 4,886,527 A * | 12/1989 | Fottinger et al. ...... 55/DIG. 39 |
| 4,917,942 A * | 4/1990 | Winters ........................ 55/486 |
| 4,938,995 A | 7/1990 | Giordano et al. |
| 5,017,670 A | 5/1991 | Frautschi et al. |
| 5,025,052 A | 6/1991 | Crater et al. |
| 5,034,265 A | 7/1991 | Hoffman et al. |
| 5,038,775 A | 8/1991 | Maruscak et al. |
| 5,039,431 A * | 8/1991 | Johnson et al. ............. 264/113 |
| 5,041,304 A | 8/1991 | Kusano et al. |
| 5,098,960 A | 3/1992 | Frautschi |
| 5,098,977 A | 3/1992 | Frautschi et al. |

(List continued on next page.)

FOREIGN PATENT DOCUMENTS

| | | |
|---|---|---|
| EP | 0447166 | 12/1991 |
| EP | 0512764 | 1/1992 |

(List continued on next page.)

OTHER PUBLICATIONS

"*High Performance Polymers and Composites*", Encyclopedia Reprint Series, Editor: Jacqueline I. Kroschwitz, John Wiley & Sons, 519–527 and 547–548.

(List continued on next page.)

*Primary Examiner*—David A. Simmons
*Assistant Examiner*—Minh-Chau T. Pham
(74) *Attorney, Agent, or Firm*—Nutter, McClennen & Fish LLP

(57) ABSTRACT

An electret filter media includes an additive or mixtures thereof that enhance the charge stability of the media. The filter media achieves acceptable alpha values for a range of filtration challenges without significant decay in alpha values over time. Preferred charge additives include fatty acid amides and mixtures thereof.

22 Claims, 1 Drawing Sheet

U.S. PATENT DOCUMENTS

| | | | |
|---|---|---|---|
| 5,099,026 A | 3/1992 | Crater et al. | |
| 5,110,620 A | 5/1992 | Tani et al. | |
| 5,145,727 A | 9/1992 | Potts et al. | |
| 5,151,183 A | 9/1992 | Sedath et al. | |
| 5,225,257 A | 7/1993 | Brant | |
| 5,234,723 A | 8/1993 | Babacz | |
| 5,242,615 A | 9/1993 | Hobbs | |
| 5,242,747 A | 9/1993 | Wu | |
| 5,246,637 A | 9/1993 | Matsuura et al. | |
| 5,254,372 A | 10/1993 | Nichols | |
| 5,256,176 A | 10/1993 | Matsuura et al. | |
| 5,342,434 A | 8/1994 | Wu | |
| 5,401,446 A | 3/1995 | Tsai et al. | |
| 5,411,576 A | 5/1995 | Jones et al. | |
| 5,472,481 A | 12/1995 | Jones et al. | |
| 5,496,396 A | 3/1996 | Allan et al. | |
| 5,514,424 A | 5/1996 | Morra et al. | |
| 5,552,226 A | 9/1996 | Thurm et al. | |
| 5,645,057 A * | 7/1997 | Watt et al. | 55/DIG. 39 |
| 5,645,627 A | 7/1997 | Lifshutz et al. | |
| 5,759,635 A | 6/1998 | Logan | |
| 5,935,303 A | 8/1999 | Kimura | |
| 6,110,251 A * | 8/2000 | Jackson et al. | 55/527 |
| 6,123,752 A * | 9/2000 | Wu et al. | 55/DIG. 39 |
| 6,171,369 B1 * | 1/2001 | Schultik et al. | 95/57 |
| 6,183,536 B1 * | 2/2001 | Schultik et al. | 95/57 |
| 6,372,004 B1 * | 4/2002 | Schultik et al. | 55/DIG. 2 |

FOREIGN PATENT DOCUMENTS

| | | |
|---|---|---|
| EP | 0594123 | 10/1993 |
| EP | 616831 A1 | 3/1994 |
| EP | 623941 A3 | 3/1994 |
| EP | 0850692 A1 | 7/1998 |
| JP | 1232038 | 9/1989 |
| WO | 9916532 | 4/1999 |
| WO | 0001737 | 1/2000 |

OTHER PUBLICATIONS

"Plasma Polymerization of Hexafluoropropylene: Film Deposition an Structure", R. Chen, et al., Journal of Applied Polymer Science, vol. 56, 615–623 (1995).

"Transparent SiO barrier coatings: conversion and production status", Eric Finson et al., Barrier Coatings, vol. 78, No. 1, Tappi Journal, 161–165 (1995).

"Preparation of Gas Separation Membranes by Plasma Polymerization with Fluoro Compounds", H. Nomura, et al., Thin Solid Films, 118, Elsevier Sequoia, 187–195 (1984).

"Plasma–structure dependence of the growth mechanism of plasma–polymerized fluorocarbon films with residual radicals", M. Horie, J. Vac. Sci. Technol. A, vol. 13, No. 5, 2490–2549 (Sep./Oct. 1995).

"Effect of Monomer Composition on the Structure and Properties of Plasma Fluoropolymers", M.S. Silverstein, et al., Department of Materials Engineering Technion–Israel Institute of Technology, Haifa, 32000, Israel, 1025–1026 (not dated).

"Plasma Deposition of Fluorinated Compounds", attila E. Pavlath, et al., Western Regional Research Center, Science and Education Administration, U.S. Department of Agriculture, Berkely, Ca 94710, American Chemical Society, 181–182 (1979).

"Hexafluoropropylene Plasmas: Polymerization Rate–Reaction Parameter Relationships", M.S. Silverstein, et al., Polymer Engineering and Science, Oct. 1996, vol. 36, No. 20, 2542–2549.

* cited by examiner

MELT BLOWN COMPOSITE HEPA FILTER MEDIA AND VACUUM BAG

CROSS-REFERENCE TO RELATED APPLICATIONS

This application claims priority from U.S. Provisional patent application Ser. No. 60/182,620, filed on Feb. 15, 2000, entitled "Melt Blown Composite HEPA Vacuum Bag," which is expressly incorporated by reference herein.

STATEMENT REGARDING FEDERALLY SPONSORED RESEARCH

Not Applicable

BACKGROUND OF THE INVENTION

Paper filter media have generally been used as disposable vacuum cleaner bags. The paper filters are comparatively inexpensive but suffer from being ineffective in the removal of extremely fine dust and dirt particles. More problematic with such filter bags is that they tend to become plugged with the trapped dirt.

The porosity of the paper filter media allows passage of fine dust through the bag wall thus permitting the filter to be at least partially filled with particulates before the air pressure drop across the bag wall increases to an unacceptable level. Reduction of the porosity of the media can improve filtration performance of the media but the effect is to increase the air pressure drop across the media. Additionally, reduced porosity of the filter media enables dirt particles to accumulate on the media surface at a faster rate than for a more porous filter, thereby causing a more rapid rate of increase in the pressure drop across the media. This phenomenon shortens the service life of the filter.

The recognition of the adverse effects of inhaled particles, especially particles in the sub-10 micron range, has led to the development of filter materials to remove these minute particles from air streams. These filters are commonly designated as HEPA (High Efficiency Particulate Air) and ULPA (Ultra Efficiency Particulate Air) filters.

The use of nonwoven microfibrous mats as the filter media for vacuum cleaner filters is known as an alternative to paper filter media. In general, microfibrous mats have higher particle capture efficiencies with comparable or lower pressure drops than paper media. However, microfibrous mats having the required air permeability are typically thicker than paper filters and tend to be significantly weaker than paper media. To circumvent this problem, a carrier fabric has been used to help facilitate handling the nonwoven. As a result, the composite layers have been thicker than standard paper filter media and do not have the handling characteristics of paper media so that they could be converted into vacuum cleaner filter bags with the same equipment used with the paper media.

Conventional filter media are substantially lacking in electrostatic charge and rely upon impingement, impaction and diffusion for filter performance. Electret filter materials offer improved filtering performance over conventional filter materials. The presence of oriented dipoles in the electret filter media is believed to enhance filter performance by allowing the filter media to attract and retain charged and uncharged particles to be filtered.

Electret filter materials are made by a variety of known techniques. One technique for manufacturing electret filter media involves extruding a polymer, typically having a high melt flow index, through a die having a linear array of orifices. An air knife is used to attenuate the extruded polymer fibers by a ratio of about 300:1. The attenuated fibers, having diameters of about one to ten micrometers, are collected on a rotating drum or moving belt using a moderate vacuum. The fiber web is then treated to impart on the fiber web charge pairs or dipoles. The charge pairs or dipoles can be imparted to the fiber, for example, using AC and/or DC corona discharge.

There is thus a need for vacuum filter bags which exhibit the advantageous properties of electret filter media while having improved charge stability and are able to maintain acceptable filter performance over time.

SUMMARY OF THE INVENTION

The present invention circumvents the problems described above by providing a multicomponent composite filter media that includes a first spunbond layer, at least one layer of a melt blown electret polymer fiber web having a melt processable fatty acid amide present within the web, and a second spunbond layer. In a preferred embodiment, the composite includes one, two, three or more melt blown electret polymer fiber webs, preferably at least 4 layers of melt blown electret polymer fiber webs, having the melt processable fatty acid amide present within the web. Optionally, the composite includes an outermost supporting layer contacted to, e.g., laminated to, the first spunbond layer. Generally, all layers are composed of a similar resin, e.g., all layers are prepared from polypropylene. In a preferred embodiment, each layer is laminated to adjacent layers by ultrasonic welding, ultrasonic bonding patterns which can be edge welded, full width, partial width or combinations thereof, adhesives, thermal bonding, calendering (pressure), or by other methods known to those having ordinary skill in the art.

The invention also provides composite filter media which have enhanced filtration performance characteristics. In particular, the present invention provides charge stabilized electret filter media that is useful for vacuum bags. The bags are both reusable and disposable.

The invention provides composite filter media which includes a melt blown electret polymer fiber web having a melt processable fatty acid amide present within the web. Typically, the melt processable amide is present at a concentration of about 0.5% to about 11% by weight, generally between about 1% to 8% by weight, preferably about 1% by weight. Suitable melt processable fatty acid amides, e.g., nonionic fatty acid amides, include stearamides or ethylene bis-stearamides. An exemplary commercially available fatty acid amide is ACRAWAX® C. In one embodiment the filter media is annealed.

The electret melt blown polymer fiber web layer(s) can be made from a variety of polymeric materials, including polypropylene, polyester, polyamide, polyvinyl chloride, polymethylmethacrylate, and polyethylene. Polypropylene is among the more preferred polymeric materials. Typically, the polymer fibers that form the web have a diameter in the range of about 1 to 15 micrometers, preferably about 3 micrometers, and the weight of the melt blown polymer fiber web is in the range of about 10 to about 100 g/m$^2$, preferably about 35 g/m$^2$.

The composite electret filter media of this invention is characterized by improved filtration performance and enhanced charge stability of the electret polymer web layer(s). In particular, the filter media is able to provide desirable filtration properties, as indicated by alpha value, despite continued filtration challenge.

In another aspect the invention relates to a method of manufacturing a composite filter media by providing a first spunbond layer and melt blowing onto the first spunbond layer a first polymer resin having a charge stabilizing fatty acid amide incorporated therein. This produces a first web of melt blown polymer fibers from the polymer resin, in which the charge stabilizing amide is present at a concentration from about 0.5% to about 11% by weight. The first melt blown web is treated to form substantially permanent charge pairs or dipoles in the first melt blown polymer web, yielding an electret material.

A second melt blown web of polymer fibers from the polymer resin having a charge stabilizing fatty acid amide incorporated therein is melt blown onto the first melt blown electret layer. Again, the charge stabilizing amide is present in the polymer resin at a concentration from about 0.5% to about 11% by weight. The second melt blown web is then treated to form substantially permanent charge pairs or dipoles in the second melt blown polymer web, yielding an electret material.

A second spunbond layer is provided onto which is melt blown a third polymer resin having a charge stabilizing fatty acid amide incorporated therein. This produces a third web of melt blown polymer fibers from the polymer resin, in which the charge stabilizing amide is present at a concentration from about 0.5% to about 11% by weight. The third melt blown web is treated to form substantially permanent charge pairs or dipoles in the first melt blown polymer web, yielding an electret material.

Optionally, a fourth melt web of polymer fibers from the polymer resin having a charge stabilizing fatty acid amide incorporated therein is melt blown onto the third melt blown electret layer. Again, the charge stabilizing amide is present in the polymer resin at a concentration from about 0.5% to about 11% by weight. The fourth melt blown web is then treated to form substantially permanent charge pairs or dipoles in the second melt blown polymer web, yielding an electret material.

The second melt blown electret polymer fiber web is then contacted with the outermost melt blown web that is formed on the second spunbond layer. That is, the second melt blown electret polymer fiber web and the third or fourth (if present) melt blown electret polymer fiber web are then contacted, e.g., laminated, to each other to form the final composite. Optionally, an outermost support layer(s) can be contacted to either the first, second or both spunbond layers to provide additional strength to the composite.

The present invention provides the advantage that the melt blown layers become entangled within the substrate layer onto which they are cast. That is, the first melt blown layer becomes entangled/enmeshed with at least the surface fibers of the first spunbond layer. The second layer is then melt blown onto the first melt blown layer and the fibers of the second melt blown layer become entangled/enmeshed with at least the surface fibers of the first melt blown layer. This process of successive layering of melt blown fiber webs onto each other provides the advantage of control of each layer's weight basis, and hence, the ability to control the air permeability of each layer. Additionally, the entanglement of fibers between each layer provides strength to the overall composite. The composite produced by the method of the invention provides a product that is more dense than those presently available. Further, the resulting product is still chargeable and allows for greater flexibility in ultrasonic bonding without any burn through.

The permanent dipoles can be imparted to the web by a variety of techniques including AC corona or DC corona discharge and combinations thereof. In one embodiment the manufacturing process can be modified by heat treating the polymer web, after charging the material by AC and/or DC corona discharge.

The filter composites of the present invention can be used in a variety of filtration applications in which a relatively stable alpha value is desired. Among the uses for such filter media are industrial face masks, ASHRAE filters, HEPA filters, e.g., HEPA vacuum filter bags, and ULPA filters.

Other advantages of the invention will be readily apparent to one having ordinary skill in the art upon reading the following description.

All percentages by weight identified herein are based on the total weight of each layer of the web unless otherwise indicated.

DETAILED DESCRIPTION OF THE INVENTION

The features and other details of the invention are described below. It will be understood that the particular embodiments of the invention are shown by way of illustration and not as limitations of the invention. The principle features of this invention can be employed in various embodiments without departing from the scope of the invention.

The present invention is based, at least in part, on a discovery that the present invention provides multicomponent electret filter media, in the form of composites, that have improved charge stability. The charge stability is manifested by acceptable alpha levels, with minimal alpha decay, when the filter media are subjected to solid and/or liquid aerosol challenges. In instances where alpha decay occurs, the final alpha value is still indicative of acceptable filter performance. The filter media of the invention include an electret polymer fiber web having incorporated therein at least one charge stabilizing additive, e.g., a fatty acid amide, or mixtures of two or more fatty acid amides. The filter media composites are useful in the manufacture of HEPA vacuum bags.

Figure 1:
FIG. 1 is a sectional view of a multicomponent electret filter media according to the present invention.

As shown in FIG. 1, the present invention provides a multicomponent composite filter media 10 that includes a first spunbond layer 12, at least one layer of a melt blown electret polymer fiber web 14, 16, 18, 20, each having a melt processable fatty acid amide present within the web at a concentration in the range of about 0.5% to 11% by weight; and a second spunbond layer 22. In a preferred embodiment, the composite includes one, two, three or more melt blown electret polymer fiber webs, preferably at least 4 layers of melt blown electret polymer fibers webs, each having incorporated within the web a melt processable fatty acid amide.

The filter media 10 may be used in a variety of filtration applications. In one aspect, the filter media 10 is used within a vacuum bag. One of ordinary skill in the art will readily appreciate the variety of suitable techniques that can be used to form a vacuum bag lined with the filter media of the present invention.

Figure 2:
FIG. 2 is a sectional view of a portion of a vacuum cleaner bag constructed using the multicomponent electret filter media according to the present invention.

FIG. 2 illustrates a partial cross sectional view of a vacuum bag 24 constructed using the filter media 10 of the present invention. The vacuum bag 24 includes at least one outermost supporting layer 26 that forms the external portion of the bag 24. Supporting layer 26 is contacted to, e.g., laminated to, the first spunbond layer 12, which forms a first internal layer. Thereafter, melt blown layers 14, 16, 18, and 20 are formed between first spunbond layer 12 and second spunbond layer 22, which forms the inner most layer of the bag 24.

Generally, all layers are composed of a similar resin, e.g., all layers are prepared from polypropylene. In a preferred embodiment, each layer is laminated to the other layers by the use of ultrasonic welding, ultrasonic bonding, adhesives or by methods known to those having ordinary skill in the art. Ultrasonic bonding can be accomplished by edge welding, full width bonding, partial width bonding, or combinations thereof.

Support layers can be made from materials that are well known to those of ordinary skill in the art. For example, the support layer(s) can be prepared from various polymer resins, including but not limited to, polyolefins such as polyethylene, polypropylene, polyisobutylene, and ethylene-alpha-olefin copolymers; acrylic polymers and copolymers such as polyacrylate, polymethylmethacrylate, polyethylacrylate; vinyl halide polymers and copolymers such as polyvinyl chloride; polyvinyl ethers such as polyvinyl methyl ether; polyvinylidene halides, such as polyvinylidene fluoride and polyvinylidene chloride; polyacrylonitrile; polyvinyl ketones; polyvinyl amines; polyvinyl aromatics such as polystyrene; polyvinyl esters, such as polyvinyl acetate; copolymers of vinyl monomers with each other and olefins, such as ethylene-methyl methacrylate copolymers, acrylonitrile-styrene copolymers, ABS resins, and ethylene-vinyl acetate copolymers; natural and synthetic rubbers, including butadiene-styrene copolymers, polyisoprene, synthetic polyisoprene, polybutadiene, butadiene-acrylonitrile copolymers, polychloroprene rubbers, polyisobutylene rubber, ethylene-propylene rubber, ethylene-propylene-diene rubbers, isobutylene-isoprene copolymers, and polyurethane rubbers; polyamides such as Nylon 66 and polycaprolactam; polyesters, such as polyethylene terephthalate; polycarbonates; polyimides; polyethers; fluoropolymers such as polytetrafluoroethylene and fluorinated ethylenepropylene.

The support layer provides strength and support, e.g., stiffness, to the composite, and it helps to remove from an air stream large pieces of dirt, particulates, and other debris. The support layer is also foldable. In general, the support layer has a weight basis of between about 0.9 ounces/yd$^2$ to about 4.0 ounces/yd$^2$, more preferably between about 1.2 ounces/yd$^2$ and about 2.0 ounces/yd$^2$, and most preferably about 1.6 ounces/yd$^2$. In one embodiment, the support layer is TYPAR® 3151, a polypropylene support manufactured by DuPont having a basis weight of 1.6 ounces/yd$^2$ and an average fiber diameter of about 22 micrometers.

Spunbond layers can be made from materials that are also well known to those of ordinary skill in the art. For example, the spunbond layer(s) can be prepared from various polymer resins, including but not limited to, polyolefins such as polyethylene, polypropylene, polyisobutylene, and ethylene-alpha-olefin copolymers; acrylic polymers and copolymers such as polyacrylate, polymethylmethacrylate, polyethylacrylate; vinyl halide polymers and copolymers such as polyvinyl chloride; polyvinyl ethers such as polyvinyl methyl ether; polyvinylidene halides, such as polyvinylidene fluoride and polyvinylidene chloride; polyacrylonitrile; polyvinyl ketones; polyvinyl amines; polyvinyl aromatics such as polystyrene; polyvinyl esters, such as polyvinyl acetate; copolymers of vinyl monomers with each other and olefins, such as ethylene-methyl methacrylate copolymers, acrylonitrile-styrene copolymers, ABS resins, and ethylene-vinyl acetate copolymers; natural and synthetic rubbers, including butadiene-styrene copolymers, polyisoprene, synthetic polyisoprene, polybutadiene, butadiene-acrylonitrile copolymers, polychloroprene rubbers, polyisobutylene rubber, ethylene-propylene rubber, ethylene-propylene-diene rubbers, isobutylene-isoprene copolymers, and polyurethane rubbers; polyamides such as Nylon 66 and polycaprolactam; polyesters, such as polyethylene terephthalate; polycarbonates; polyimides; polyethers; fluoropolymers such as polytetrafluoroethylene and fluorinated ethylenepropylene.

The spunbond layer provides additional strength and support, e.g., stiffness, to the composite and it also helps to remove from an airstream intermediate size pieces of dirt, particulates, and other debris. The spunbond layer further provides a substrate onto which the melt blown polymer resin can be extruded. The fibrous surfaces of the spunbond layer and the melt blown fibers become entangled and enmeshed, thereby providing integrity to the composite. In general, the spunbond layer has a weight basis in the range of about 0.2 ounces/yd$^2$ to 3.0 ounces/yd$^2$, more preferably about 0.2 ounces/yd$^2$ to 1.5 ounces/yd$^2$, to most preferably about 0.25 ounces/yd$^2$. Typical spunbond materials having a basis weight in the range of about 0.25 ounces/yd$^2$ to 1.0 ounce/yd$^2$ and have an average fiber diameter in the range of about 8 micrometers to 13 micrometers. An example of a suitable commercially available spunbond material is the polypropylene spunbond material provided by PGI having a basis weight of about 0.25 ounces/yd$^2$.

Examples of charge stabilizing additives that are incorporated into the melt blown layer(s) include fatty acid amides derived from fatty acids. The term "fatty acid" is recognized by those having ordinary skill in the art and it is intended to include those saturated or unsaturated, straight or branched chain carboxylic acids obtained from the hydrolysis of fats. Examples of suitable fatty acids include lauric acid (dodecanoic acid), myristic acid (tetradecanoic acid), palmitic acid (hexadecanoic acid), stearic acid (octadecanoic acid), oleic acid ((Z)-9-octadecenoic acid), linoleic acid ((Z,Z)-9,12-octadecadienoic acid), linolenic acid ((Z,Z,Z)-9,12,15-octadecatrienoic acid), and eleostearic acid (Z,E,E)-9,11,13-octadecatrienoic acid). Typically the amides formed from the above referenced acids are primary amides which are prepared by methods well known in the art.

Suitable charge stabilizing agents include secondary and tertiary fatty acid amides wherein the amide nitrogen is substituted with one or more alkyl groups. Secondary and tertiary fatty acid amides can also be prepared by methods well known in the art, such as by esterification of a fatty acid followed by an amidation reaction with a suitable alkylamine. The alkyl substituents on the amide nitrogen can be straight chain or branched chain alkyl groups and can have from two to about twenty carbon atoms, inclusive, preferably between from two to about fourteen carbon atoms, inclusive, more preferably between from two to about six carbon atoms, inclusive, most preferably about two carbon atoms. In a preferred embodiment, the fatty acid amide can be a "bis" amide in which an alkyl chain tethers two nitrogens of two independent amide molecules. For example, alkylene bis-fatty acid amides include alkylene bis-stearamides, alkylene bis-palmitamides, alkylene bis-myristamides and alkylene bis-lauramides. The alkyl chain tether typically includes about two to eight carbon atoms, inclusive, and preferably two carbon atoms. The alkyl chain tether can be branched or unbranched. Exemplary bis fatty acid amides include ethylene bis-stearamides and ethylene bis-palmitamides such as N,N'-ethylenebistearamide and N,N'-ethylenebispalmitamide.

In certain embodiments, the charge stabilizing additive, e.g., a fatty acid amide, can be present within the polymer fiber web at a concentration in the range of about 0.5% to about 11% by weight. In other embodiments, the charge stabilizing additive can be present within the polymer fiber web at a concentration in the range of about 0.5% to about 8% by weight. A preferred concentration range for the fatty acid amide charge stabilizing additive is about 1% by weight of the web. The ranges of concentrations intermediate to those listed are also intended to be part of this invention, e.g., about 2.5% to about 9%, 4.0% to about 6%, and about 1% to about 1.5% by weight. For example, ranges of concentration using a combination of any of the above values recited as upper and/or lower limits are intended to be included, e.g., 1% to about 6%, 2.5% to about 11%, etc.

One group of useful charge stabilizing additives, as noted above, is fatty acid amides. Examples of preferred fatty acid amides include stearamide and ethylene bis-stearamide. An exemplary stearamide is commercially available as UNI-WAX 1750, available from UniChema Chemicals, Inc. of Chicago, Ill. ACRAWAX® C is an ethylene bis-stearamide which is commercially available from Lonza, Inc. of Fair Lawn, New Jersey. ACRAWAX® C contains N,N'-ethylenebissteramide (CAS No. 110-30-5) and N,N'-ethylenebispalmitamide (CAS No. 5518-18-3) with a mixture of C-14 to C-18 fatty acid derivatives (CAS No. 67701-02-4) with an approximate ratio of 65/35/2 (N,N'-ethylenebissteramide/N,N'-ethylenebispalmitamide/ mixture of C-14 to C-18 fatty acid derivatives) by weight. For example, the commercial product includes N,N'-ethylenebisstearamide, N,N'-ethylenebispalmitamide with C14–C18 fatty acids. In certain embodiments of the invention, either N,N'-ethylenebisstearamide or N,N'-ethylenebispalmitamide can be the sole charge stabilizing additive. In another embodiment, the ratio of a C14–C18 fatty acid can be varied from between about 0 to 20% based on the total amount of the bisamides. In still other embodiments, mixtures of N,N'-ethylenebisstearamide and N,N'-ethylenebispalmitamide which fall in the range between about 0 to 100% for each bisamide can be utilized as additive mixtures, e.g., 80/20, 70/30, 5/50, etc.

The polymers used to form the fibers of the melt blown web(s) can be selected from among many suitable polymers, such as those listed above for spunbond or support layer resins. Examples of these polymers include polyethylene, polyester, polyamide, polyvinyl chloride, polymethyl methylacrylate and, preferably, polypropylene.

One of ordinary skill in the art will appreciate that melt blown webs are comprised of fibers having a relatively broad fiber diameter distribution. The average fiber diameter of the polymer used to form the polymer fiber web generally is in the range of about 1 to about 15 micrometers, inclusive. Depending on the intended application, a more preferred average polymer fiber diameter is in the range of about 2 to about 5 micrometers, inclusive, more preferably about 3 micrometers.

The web basis weight of the polymer fiber web will vary depending upon the requirements of a given filtering application. In general, higher web basis weights yield better filtration, but there exists a higher resistance, or pressure drop, across the filter barrier when the filter media has a higher basis weight. For most applications the web basis weight can be in the range of between about 10 to about 100 g/m$^2$, inclusive. Preferably the web basis weight is in the range of between about 30 to about 60 g/m$^2$, inclusive, more preferably between about 30 to about 50 g/m$^2$, inclusive, preferably about 35 g/m$^2$. One of ordinary skill in the art can readily determine the optimal web basis weight, considering such factors as the desired filter efficiency and permissible levels of resistance. Furthermore, the number of plies of the melt blown polymer fiber web used in any given filter application can also vary from approximately 1 to 10 plies. One of ordinary skill in the art can readily determine the optimal number of plies to be used.

As noted above, the melt processable fatty acid amide is intimately dispersed throughout the fiber web fibers that make up the polymeric fiber web. Preferably, the melt processable fatty acid amide is thoroughly mixed with the polymer resin to form polymer pellets that are able to be extruded into fibers having the amide incorporated therein. Those having ordinary skill in the art will appreciate that the fatty acid amide can be incorporated into a polymer resin in a number of ways. In one example, the fatty acid amide can be combined with polymer resin using a two screw extruder, yielding pellets with a concentrated amount of the fatty acid amide. These concentrated pellets can then be combined with fatty acid amide-free polymer pellets having no amide additive in an extrusion process that yields the desired polymer fiber web.

Filter performance is evaluated by different criteria. It is desirable that filters, or filter media, be characterized by low penetration across the filter of contaminants to be filtered. At the same time, however, there should exist a relatively low pressure drop, or resistance, across the filter. Penetration, often expressed as a percentage, is defined as follows:

$$Pen = C/C_0$$

where C is the particle concentration after passage through the filter and $C_0$ is the particle concentration before passage through the filter. Filter efficiency is defined as 100–% Penetration.

Because it is desirable for effective filters to maintain values as low as possible for both penetration and pressure drop across the filter, filters are rated according to a value termed alpha ($\alpha$), which is the slope of log penetration versus pressure drop across the filter. Steeper slopes, or higher alpha values, are indicative of better filter performance. Alpha is expressed according to the following formula $$\alpha = -100 \log (C/C_0)/D\,P,$$

where D P is the pressure drop across the filter.

In many filtering situations it is important to have a high initial alpha value. However, it is equally, if not more important, to maintain acceptable alpha values well into the filtration process. The problem of decaying alpha values is, as noted above, a problem often encountered in certain filtration procedures. In many instances it is thus important to achieve acceptable alpha values well into the filtering process. Some standard tests for evaluating filter performance focus on penetration and resistance (as related by alpha value) after 200 milligrams of loading. Alpha decay is generally not a problem in filtering gases that contain only solids. In fact, in such filtering applications the alpha value often increases over time. The phenomenon of alpha decay is more evident while filtering gases that contain liquid droplets or a mixture of liquid droplets and solid particles.

An exemplary DOP challenge employs an automated filter testing unit purchased from TSI, Inc. equipped with an oil generator. The instrument measures pressure drop across filter media and the resultant penetration value on an instantaneous or "loading" basis at a flow rate less than or equal to 115 liters per minute (1 pm). Instantaneous readings are defined as 1 pressure drop/penetration measurement.

An exemplary NaCl test procedure employs a CertiTest™ automated filter testing unit from TSI, Inc. equipped with a sodium chloride generator. The average particle size created by the unit is 0.3 to 0.5 micrometers. The instrument measures a pressure drop across the filter media and the resultant penetration value on an instantaneous basis at a flow rate less than or equal to 115 liters per minute (1 pm). Instantaneous readings are defined as 1 pressure drop/penetration measurement.

One of ordinary skill in the art will recognize the need to balance particle penetration across a filter with the resistance to which the filter is subjected during filtration. In addition, it is also necessary to balance high initial alpha values with the alpha values after some degree of filtration challenge. The concentration of charge additives used according to the present invention as well as the identity of the charge additives can be varied to achieve optimal performance of electret filter media.

Filter efficiency and properties of the electret filter media of the invention can also be optimized through additional processing techniques. In one embodiment the polymer web, which has incorporated therein the charge stabilizing additive, can be heat treated after the web is charged or treated to form a permanent dipole. Heat treating the web at this stage of the manufacturing process can enhance the charge stability in the resulting filter media. Heat treatment can usually be conducted at temperatures in the range of about 65° C. to about 232° C., inclusive, preferably between about 121° C. to about 165° C., inclusive, for approximately 0.25 minutes to about 5 minutes, inclusive, more preferably for about 1.5 minutes to about 3 minutes. An exemplary protocol involves heat treating for approximately 2.5 minutes at 143° C. Such a post-charging heat treatment technique is particularly useful to enhance filter performance.

Preferably, heat treatment is applied to the electret filter after charging or formation of the permanent dipoles. Such heat treatment can result in a lower initial alpha, but the alpha values after a degree of filter loading tend to be higher than those achieved with filter materials that do not receive heat treatment. Heat treatment of the electret filter can be accomplished by methods known in the art, such as infrared heaters, microwave heaters, oil or water heated rollers, and convection ovens. Preferably, the step of heat treating, e.g., annealing, is performed by convection, thereby affording uniform annealing of the melt blown fiber web which contains the melt processable fatty acid amide within the web. In general, the fatty acid amide appears to be more sensitive to the effects of post-charging heat treatment than are other classes of charge stabilizing additives. That is, heat treating tends to cause the fatty acid amide to migrate to the polymer surface more readily than do other charge stabilizing additives.

A variety of techniques are well known to impart a permanent dipole to the polymer web in order to form electret filter media. Charging can be effected through the use of AC and/or DC corona discharge units and combinations thereof. The particular characteristics of the discharge are determined by the shape of the electrodes, the polarity, the size of the gap, and the gas or gas mixture. In one embodiment charging can be accomplished solely through the use of an AC corona discharge unit. In another embodiment it is useful to use both AC and DC corona discharge units. In a preferred technique the polymer web is first subjected to AC corona discharge followed by one or more successive treatments by a DC corona discharge unit. Charging can also be accomplished using other techniques, including friction-based charging techniques. Typically the fiber web is subjected to a discharge of between about 1 to about 30 kV (energy type, e.g., DC discharge or AC discharge)/cm, inclusive, preferably between about 10 kV/cm and about 30 kV/cm, inclusive, with a preferred range of between about 10 to about 20 kV/cm, inclusive.

It will be appreciated by one of ordinary skill in the art that corona unit(s), AC corona discharge unit(s) and/or DC corona discharge unit(s) can be placed above and/or below a melt blown fiber web to impart electret properties to the fiber web. Configurations include placement of a neutrally grounded roll(s) on either side of the fiber web and the active electrode(s) above or below either side of the web. In certain embodiments, only one type of corona discharge unit, e.g., a DC or an AC corona discharge unit, is placed above, below or in an alternating arrangement above and below the fiber web. In other embodiments alternating AC or DC corona discharge units can be used in combination. The AC or DC corona discharge unit can be controlled so that only positive or negative ions are generated.

In one embodiment, a permanent dipole can be imparted to the polymer fiber web as follows. The web is first charged using an AC corona, followed by a charging with a series of DC corona discharge units, e.g., DC charge bars. The DC corona discharge units are positioned on alternating sides of the passing fiber web and each successive DC corona discharge unit applies a charge of a different polarity, i.e., positive/negative. In a preferred embodiment, the charge of the DC corona discharge units located above and below the nonwoven web alternates from positive to negative in a series of treatments, e.g., 2, 4, 6, etc. Alternatively, the DC corona discharge units are positive or negative and do not alternate in charge.

An example of a process for producing electret properties in fiber webs can be found in U.S. Pat. No. 5,401,446, the contents of which are incorporated herein by reference.

The present invention also provides methods to manufacture a composite filter media by providing a first spunbond layer and melt blowing onto the first spunbond layer a first polymer resin having a charge stabilizing fatty acid amide incorporated therein. This produces a first web of melt blown polymer fibers in which the charge stabilizing amide is present at a concentration from about 0.5% to about 11% by weight. The first melt blown web is treated to form therein substantially permanent charge pairs or dipoles thus creating an electret.

A second melt blown web of polymer fibers from the polymer resin having a charge stabilizing fatty acid amide incorporated therein is then melt blown onto the first melt blown electret layer. Again, the charge stabilizing amide is present in the polymer resin at a concentration in the range of about 0.5% to 11% by weight. The second melt blown web is likewise treated to form substantially permanent charge pairs or dipoles creating an electret.

Separately, a second spunbond layer is provided onto which is melt blown a third polymer resin having a charge stabilizing fatty acid amide incorporated therein. This produces a third melt blown fiber web in which the charge stabilizing amide is present at a concentration from about 0.5% to about 11% by weight. The third melt blown web is treated to form substantially permanent charge pairs or dipoles, creating an electret.

Optionally, a fourth melt blown web of polymer fibers from the polymer resin having a charge stabilizing fatty acid amide incorporated therein is melt blown onto the third melt blown electret layer. Again, the charge stabilizing amide is present in the fourth melt blown layer at a concentration in the range of about 0.5% to 11% by weight. The fourth melt blown web is then treated to form substantially permanent charge pairs or dipoles, creating an electret.

The second melt blown electret polymer fiber web is then joined to the third melt blown electret polymer fiber web (or the fourth web, if present) to form the final composite. These two composite components can be joined by any suitable process, such as lamination. Optionally, an outermost support layer(s) can be joined to either or both of the first or second spunbond layers to provide additional strength to the composite.

One useful technique for processing the filter composite media of the invention is described as follows. The filter composite media can be prepared by forming, such as in an extruder, a first web of melt blown polymer film from a polymer resin such as polypropylene. The resin includes, in concentrated form, a desired amount of the charge stabilizing additive, e.g., a fatty acid amide as described supra. The resulting web can be attenuated at a processing station, such as by drawing the fibers at a ratio of about 300:1. As each web is deposited it is subjected to charge treatment (which can be a corona unit, an AC discharge unit, a DC corona discharge unit or combinations thereof) to form substantially permanent charge pairs or dipoles in the melt blown polymer web and spunbond layer. In some instances it may be preferred to use an AC corona discharge unit followed by a DC corona discharge unit at a processing station. Alternatively, charging can be effected using an AC corona discharge unit followed by one or more successive treatments in a DC corona discharge unit. Charging can also be accomplished using other techniques, including friction-based techniques.

Subsequent to forming and charging the composite electret filter media, and as noted above, the media can be subjected to heat treatment to improve charge retention properties of the media. For example, heat treatment may take place at temperatures in the range of between about 65° C. to about 232° C., inclusive, for approximately 0.25 minutes to about 5 minutes, inclusive. A heat treatment protocol exposes the media to temperatures in the range of about 143° C. for 2.5 minutes. Heat treatment can be conducted individually for each melt blown layer, or the entire composite can be heat treated.

In another embodiment the charge stabilizing additive need not be included as a concentrate with the polymer resin. Instead, a liquid form of the additive or additive mixture can be sprayed onto the extruded fibers that form the polymer web.

The following examples serve to further described the invention.

EXAMPLES

In examples provided infra, a flow rate of 52 lpm and a test filter area of 100 cm$^2$ were used. The filtration media was placed within the instrument and closed for an instantaneous measurement.

A polypropylene fatty acid amide annealed electret fiber web was prepared by the following process. Approximately 99 pounds of polypropylene resin was melt blended with approximately 1 pound of ACRAWAX® C at a temperature between of about 545° F. for approximately 4 minutes prior to extrusion into a spinnerette. The polymer/ACRAWAX melt blend was heated in an extruder to a temperature of about 545° F. in an extruder heated to about 545° F. The polymer melt blend was passed through a connecting hose to a melt pump and maintained at about 545° F. The polymer melt blend was then passed into a spinnerette die body, maintained at about 545° F. and fed through die tips, thereby forming fibers. The fibers were then cooled to a temperature of about 37° C.

The resultant fibers were sprayed onto a 0.25 oz/yd$^2$ spunbond layer on a rotating drum or belt, with suction, thereby forming a nonwoven web about approximately 72 inches wide having a fiber diameter of about 3 μm and a weight of about 35 g/m$^2$. The fibers were collected onto the spunbond with suction at a line speed of about 74 feet per minute.

The nonwoven web was then immediately AC corona discharge treated. The apparatus was configured such that the nonwoven web was passed through a gap formed between an electrode and silicone sleeve portion of the corona unit. The gap width between the electrode and silicone sleeve of the corona unit was about 0.08 inch. The corona charge applied to the nonwoven web was about 0.5 kilowatts/cm at about 30 kilovolts/cm. The treatment time with the corona charge was about about 0.05 seconds.

The nonwoven corona treated web was immediately thereafter treated with DC corona discharge at about 30 kilovolts/cm at about 3 milliamperes for about 0.05 seconds. During the corona and DC discharge treatments, the temperature of the surrounding process area was maintained at or below 80° F. with the relative humidity at or below 18%.

This process was repeated, such that a second layer of melt blown fibers are extruded onto the first layer of melt blown fibers. Similarly, a second spunbond layer was treated as above. The spunbond layers having the melt blown electret fiber webs were laminated to each other to form a final composite. The composite was joined to a stiff TYPAR support layer. All layers were adhered using Branson ultrasonic welding units, employed with a down pressure of 30 psi and an amplitude of 75%. Welding and collating of the layers was accomplished at 18 feet per minute.

The resulting seven layer filter electret composite was prepared as described above, wherein the first layer was a stiff polypropylene support layer, TYPAR 3151, the second layer was a 0.25 ounce/yd$^2$ polypropylene spunbond, layers three through six were melt blown polypropylene fibers with 1.0% ACRAWAX, and layer seven was a 0.25 ounce/yd$^2$ polypropylene spunbond. The table below illustrates various properties of the material as well as the data achieved when the material was subjected to NaCl and DOP challenges.

| Physical Property | Value |
|---|---|
| Basis Weight of 7-layered composite | 225 g/m$^2$ |
| Thickness of 7-layered composite | 75.3 mils |
| NaCl Resistance | 29.7 mm H$_2$O at 52 lpm |
| NaCl Penetration | 0.001% at 52 lpm |
| DOP Resistance | 29.15 mm H$_2$O at 52 lpm |
| DOP Penetration | 0.007% at 52 lpm |
| Fiber Diameter of Melt blown layers | about 3 microns |
| Air permeability of Individual melt blown layers | about 47 cfm/ft$^2$ |

The efficiency of the filter composite was greater than 99.97%.

Those of ordinary skill in the art will know, or be able to ascertain, using no more than routine experimentation, many equivalents to the specific embodiments of the invention described herein. These and all other equivalents are intended to be encompassed by the following claims. All publications and references cited herein are expressly incorporated by reference in their entirety.

What is claimed is:

1. A filter media formed from a multicomponent sheet, the sheet comprising
   a first spunbond layer;
   a second spunbond layer; and
   at least one layer of a melt blown electret polymer fiber web disposed between the first and second spunbond layers and meltblown onto at least one of the first and second spunbond layers, the at least one layer of a melt blown electret polymer fiber web having a melt processable fatty acid amide present within the web at a concentration in the range of about 0.5% to 11% by weight.

2. The filter media of claim 1, further including an outermost supporting layer.

3. The filter media of claim 2, wherein the outermost supporting layer is polypropylene.

4. The filter media of claim 2, wherein the outermost supporting layer has a weight in the range of about 0.9 ounces/yd$^2$ to 4.0 ounces/yd$^2$.

5. The filter media of claim 2, wherein the outermost supporting layer has a weight of about 1.6 ounces/yd$^2$.

6. The filter media of claim 1, wherein the first spunbond layer is polypropylene.

7. The filter media of claim 1, wherein the first spunbond layer has a weight in the range of about 0.25 ounces/yd$^2$ to 3.0 ounces/yd$^2$.

8. The filter media of claim 1, wherein the first spunbond layer has a weight of about 0.25 ounces/yd$^2$.

9. The filter media of claim 1, wherein the sheet comprises four layers of melt blown electret polymer fiber web having the melt processable fatty acid amide present within each of the melt blown electret polymer fiber web layers.

10. The filter media of claim 9, wherein the melt blown electret polymer fiber webs are polypropylene.

11. The filter media of claim 1, wherein each layer of melt blown electret polymer fiber web has a weight in the range of about 10 to 100 g/m$^2$.

12. The filter media of claim 1, wherein each layer of melt blown electret polymer fiber web has an average fiber diameter in the range of about 1 to 15 micrometers.

13. The filter media of claim 1, wherein the concentration of the fatty acid amide in each layer is about 1%.

14. The filter media of claim 1, wherein the fatty acid amide is selected from the group consisting of stearamide, ethylene bis-stearamide, and mixtures thereof.

15. The filter media of claim 2, used to form a vacuum bag.

16. A vacuum bag, comprising:
    an outermost support layer; and
    a filter media in the form of a multicomponent sheet having
        a first spunbond layer contacted to the outermost support layer,
        a second spunbond layer forming an innermost portion of the vacuum cleaner bag, and
    at least one layer of a melt blown electret polymer fiber web disposed between the first and second spunbond layers and meltblown onto at least one of the first and second spunbond layers, the at least one layer of a melt blown electret polymer fiber web having a melt processable fatty acid amide present within the web at a concentration in the range of about 0.5% to 11% by weight.

17. The vacuum bag of claim 16, wherein the outermost supporting layer is polypropylene.

18. The vacuum bag of claim 16, wherein the first spunbond layer has a weight in the range of about 0.25 ounces/yd$^2$ to 3.0 ounces/yd$^2$.

19. The vacuum bag of claim 16, wherein four layers of melt blown electret polymer web are present.

20. The vacuum bag of claim 19, wherein the melt blown electret polymer fiber webs are polypropylene.

21. The vacuum bag of claim 20, wherein each layer of melt blown electret polymer fiber web has a weight in the range of about 10 to 100 g/m$^2$.

22. The vacuum bag of claim 21, wherein each layer of melt blown electret polymer fiber web has an average fiber diameter in the range of about 1 to 15 micrometers.

* * * * *